(12) United States Patent
Goodenough

(10) Patent No.: US 6,708,722 B1
(45) Date of Patent: Mar. 23, 2004

(54) WATER FLOW CONTROL SYSTEM

(76) Inventor: Robert A Goodenough, 3430 Chula Vista Dr., East Jordan, MI (US) 49727

( * ) Notice: Subject to any disclaimer, the term of this patent is extended or adjusted under 35 U.S.C. 154(b) by 0 days.

(21) Appl. No.: 10/117,023

(22) Filed: Apr. 5, 2002

(51) Int. Cl.[7] ............................. F16K 17/00; E03B 7/04
(52) U.S. Cl. ............................. 137/487.5; 137/624.11; 137/460
(58) Field of Search ..................... 137/487.5, 624.11, 137/460, 624.12

(56) References Cited

U.S. PATENT DOCUMENTS 4,797,666 A * 1/1989 Baxter et al. ............... 340/606
4,868,566 A   9/1989 Strobel ..................... 340/870.3
4,880,030 A  11/1989 Terry ........................... 137/460
6,209,576 B1  4/2001 Davis ......................... 137/487.5

* cited by examiner

*Primary Examiner*—Kevin Lee
(74) *Attorney, Agent, or Firm*—Leo H. McCormick, Jr.

(57) ABSTRACT

An adjustable timing system controlled by a water meter indicator activates an electric shut-off valve at a main water supply to a building or apartment unit if a continuous flow of water exceeds the time setting. The timing system may optionally be set to a full open condition bypassing the timing function and allowing unrestricted water flow or an off condition preventing any water flow. The timing system is reset to begin anew timing the continuous flow of water each time that flow ceases and may be manually reset after a continuous flow of water has exceeded the time setting or a power interruption has disabled the water flow.

21 Claims, 4 Drawing Sheets

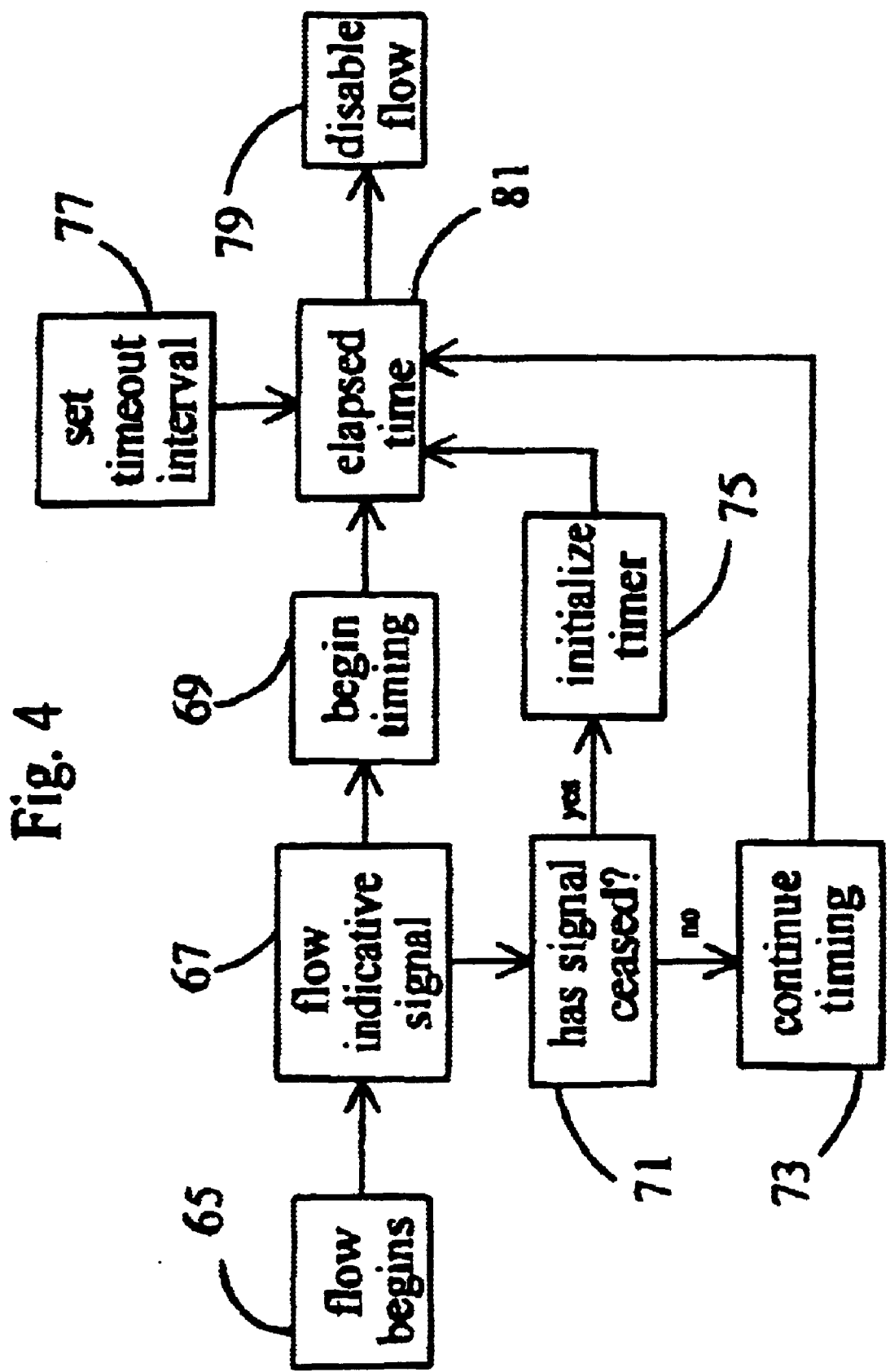

WATER FLOW CONTROL SYSTEM

The present invention relates to fluid supply systems, especially residential or commercial water supply system's and more particularly to a water flow control system operable in response to continuous flow for more than a predetermined time to shut off the water supply thereby terminating flow after the predetermined time.

BACKGROUND OF THE INVENTION

It is desirable to prevent the excessive flow of water and resultant damage in a home, apartment or business in case of a leakage, freezing or vandalism or electrical outage. Excess water flow may occur from a number of other causes. For example, a leaking toilet valve, while not causing damage, may allow water to flow for an extended period of time resulting in an excessive water bill. It has been suggested to accomplish this by measuring water flow and turning the system off after a predetermined volume of water has flowed. Such an approach is slow to react to modest leakage and major damage may have already occurred by the time the system reacts. It has also been suggested to prevent excessive flow and damage by monitoring a water pressure differential and disabling the flow if this differential becomes too great. This technique works well for catastrophic leaks, but has the disadvantage of never detecting minor leaks that can cause great damage over a period of time.

SUMMARY OF THE INVENTION

The present invention provides a technique for minimizing damage due to water leaks in residential, business or other buildings.

The invention comprises, in one form thereof, a water supply system and process of operating the system to avoid excess inadvertent water loss as might be caused, for example, by leaks, a plumbing fixture malfunction, vandalism or interruption of electricity to a heating system of more than a predetermined time period. Water flow is monitored and the flow disabled if the monitoring indicates the detected flow has continued uninterrupted for a predetermined time interval. Flow interruption is achieved by removing electrical drive from a normally closed solenoid operated water valve. The system is reset or initialized to await a subsequent detection of water flow if the detected flow ceases prior to expiration of the predetermined time interval. The system operates substantially independent of the volume of water flow.

An advantage of the present invention is that the water system is shut off in response to detected water flow exceeding a predetermined time rather than depending on less leak indicative pressure changes or total flow measurements.

BRIEF DESCRIPTION OF THE DRAWINGS

FIG. 4 is a flow chart illustrating the fluid supply operating process of the present invention.

Corresponding reference characters indicate like or similar parts throughout the several drawing views.

DETAILED DESCRIPTION OF THE INVENTION

Figure 1:
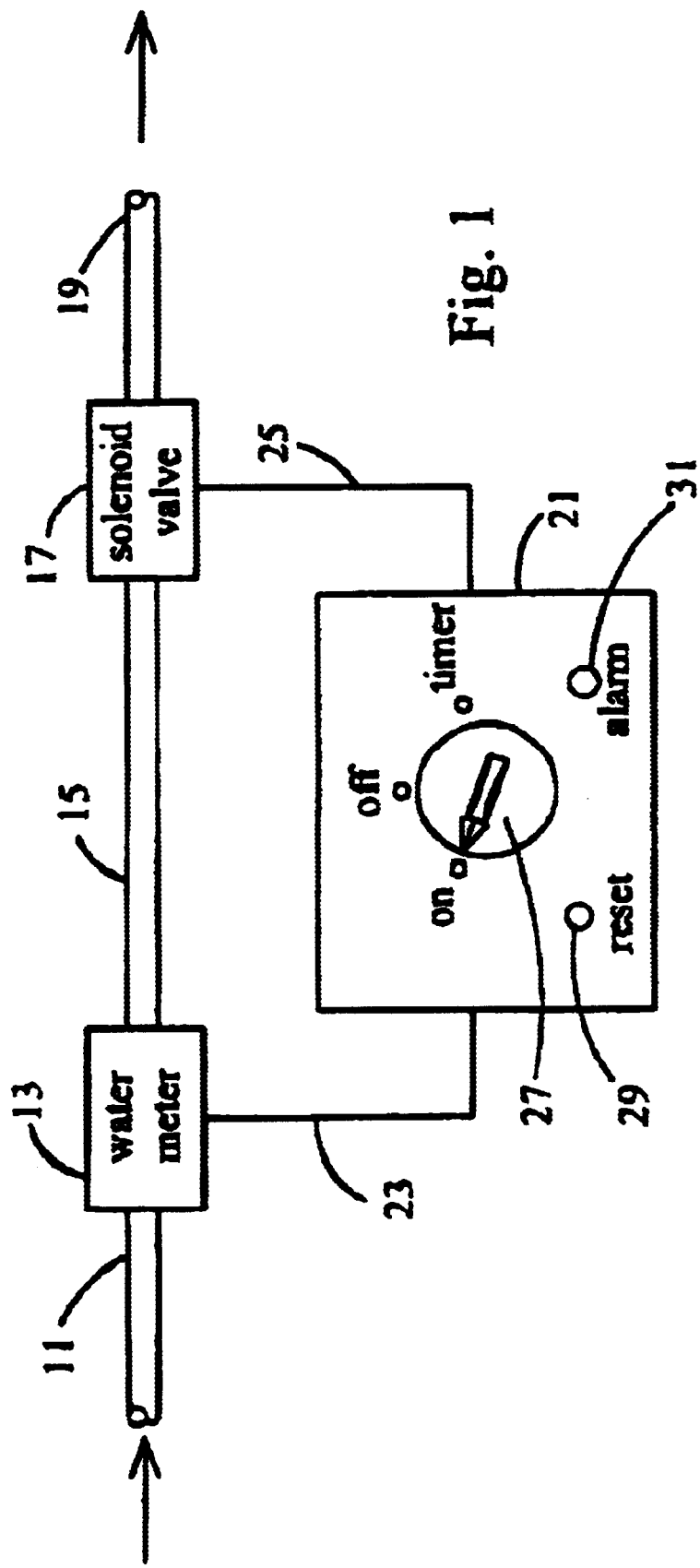
FIG. 1 is a fluid flow detecting system according to the present invention in one form.

Referring now to the drawings and particularly to FIG. 1, there is shown a water flow control system designed to avoid excess inadvertent fluid loss. The system includes a water flow detecting and signal generating device 13 for detecting a flow of water from inlet conduit 11 into intermediate conduit 15 and ultimately to a water utilization system such as a residence, apartment complex or business as illustrated by conduit 19. The device 13 may, for example, be a water meter as shown in FIG. 1. The device 13 functions as a fluid flow indicative signal source and monitors the system to detect a flow of water or other fluid by issuing fluid flow indicative-signals on line 23 so long as a fluid flow is detected. There is a normally closed solenoid valve 17 in circuit between conduits 15 and 19 which allows full water flow so long as its solenoid is energized, but closes upon loss of solenoid drive current. This valve may, for example, be an open frame, general-purpose solenoid valve such as the ASCO Red Hat II series 8003G or 8292G, or other suitable fluid valve. Under normal water usage conditions, the solenoid is maintained energized by a signal on line 25 from a timing and control unit 21 shown in greater detail in FIG. 2. When switch 27 is in the Atimer≈ position, operation of a timing circuit to measure a predetermined time interval is initiated in response to an initial fluid flow indicative signal on line 23. Upon expiration of the predetermined time interval, the fluid supply system is disabled by removing drive from line 25 closing the solenoid valve 17 and stopping the flow of fluid. An alarm indication such as buzzer, alarm light or other suitable indicator 31 indicates the water supply has been disabled. Manual resetting of the system and resumption of water availability may be achieved by momentarily depressing reset button 29. If the flow of water stops prior to expiration of the predetermined time interval, causing the cessation of fluid flow indicative signals on line 23 for a sufficient time, the time interval measurement is interrupted and reset or initialized to be reinitiated upon receipt of a new initial fluid flow indicative signal. Switch 27 may be moved to the Aon≈ position to selectively enable the system to continuously supply fluid for time periods in excess of the predetermined time interval. Movement of switch 27 to the Aoff≈ position manually interrupts a supply of electrical energy to the solenoid valve 17 and selectively overrides the system to prevent the flow of fluid independent of fluid flow detection. This position may be utilized, for example, during a vacation or other prolonged absence. Overriding of the normal functioning of the system also occurs upon inadvertent interruption of a supply of electrical energy for a predetermined period of time since interruption of the supply of electrical energy most often would also effect the operation of a heating system. If the heating system were disabled for an extended period of time, damage to a water system may not be immediately detected when electrical energy was again provided to the heating system so some positive action is required to activate the water system after a power interruption.

Figure 2:
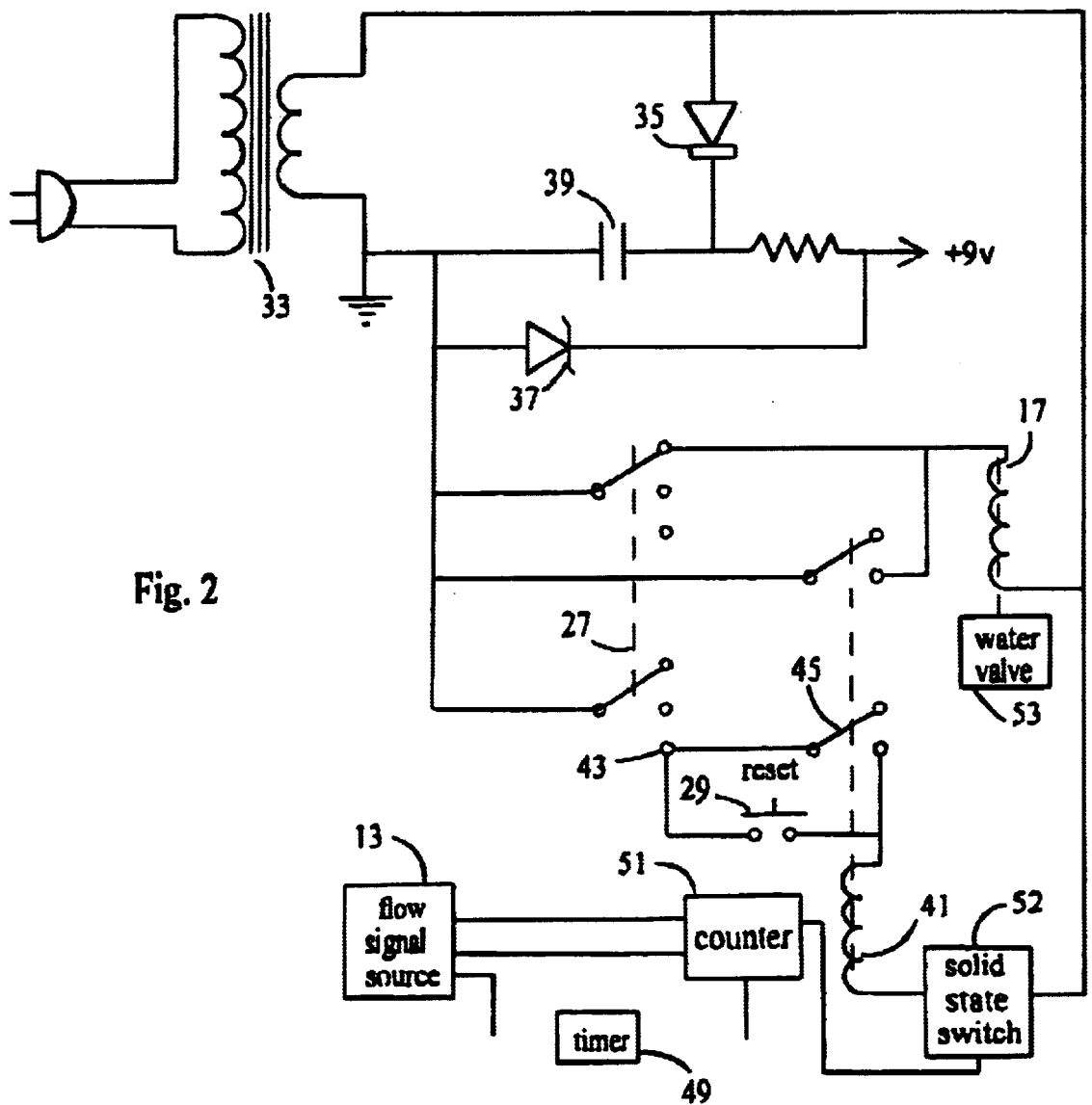
FIG. 2 is a schematic illustration of the electrical portion of the system of FIG. 1.

In FIG. 2, the primary winding of transformer 33 is connected to a plug which may be coupled to a conventional 120 volt outlet. The transformer secondary provides a lower operating voltage such as 24 volts for the circuit. Rectifier 35, capacitor 39 and 9 volt Zener diode 37 provide a 9 volt direct current for certain of the solid state components such as timer 49. Switch 27 is seen to be a double-pole, triple throw switch shown In a first or upper position in which the control system is disabled allowing unrestricted water flow because the solenoid 17 is directly grounded by the upper movable contact and maintains the water valve 53 open. This is the Aon≈ position of FIG. 1. Switch 27 may be moved to an Aoff≈ position in which neither movable contact couples any of the circuit components and where the control system disables the solenoid actuated valve preventing water flow. In the Atimer≡ position, the lower movable contact of switch 27 connects terminal 43 to ground. This is the third switch position in which the control system is operable to interrupt water flow only upon detecting substantially uninterrupted flow for the predetermined time interval.

Solenoid 41 controls a double-pole, double-throw solenoid actuated relay having an upper pair of normally open contacts which are operable when the solenoid is energized and the contacts closed to supply enabling current to the solenoid actuated valve 17. The contacts of the relay are illustrated in FIG. 2 in the de-energized (normal) position. The solenoid actuated relay also has a second lower pair of normally open contacts which are operable when the solenoid is enabled and the contacts closed to form part of a latching circuit to maintain the solenoid energized by current flow from the transformer 33 secondary, through the conducting solid state switch 52, solenoid 141 coil, closed movable contact 45, and by way of terminal 43 of switch 27 to the grounded side of the transformer secondary. While not shown, alarm 31 may, for example, be a light or audible alarm connected between the hot or upper end of transformer 33 secondary winding and the lower grounded side of the secondary by the upper normally closed contacts of the solenoid actuated relay. The upper normally open contacts of solenoid 41 selectively connect solenoid 17 to ground while the lower normally open contacts selectively connect the winding of solenoid 41 to ground. Of course, the relationship of the switch, relay contacts and solenoids may be reversed so that the switch and relay contacts control the hot side of the transformer secondary rather than the grounded side if desired.

The water flow detecting and signal generating device 13 may, as shown in FIG. 1 comprise a digital signal generating water meter or, as in FIG. 2, some other flow indicative signal source. In one specific embodiment, a Badger Meter model RTR which provided five to seven volt pulses having a test circle indication and an electronic resolution of one-tenth of the test circle was employed. This meter is similar to the one illustrated by U.S. Pat. 4,868,566. Other digital or analog metering techniques could be employed so long as a flow indicative signal is provided. Upon receipt, of the first pulse or other flow indicative signal, a first timing circuit illustrated as a counter 51 begins timing of a predetermined time interval. In one form, the predetermined time interval was selectively adjustable through a range up to a maximum of about one hour. If the counter 51 reaches a prescribed count indicative, of expiration of the predetermined time interval, solid state switch 52 opens removing drive to the solenoid valve 17 allowing the normally closed solenoid actuated valve to assume its closed position interrupting the flow of water. With digital flow indicative signals, a second timer 49 begins timing of another time interval after receipt of each pulse, but is restarted upon receipt of each subsequent pulse. Thus, so long as the water flow continues, timer 49 never completes its task. However, upon expiration of the other time interval indicating a prescribed period of time in which no flow was indicated, the count of counter 51 is reset to its initial value and will only commence counting again upon receipt of a new flow indicative signal from 13. In this way, the second timer 49 resets the first timing device 51 to an initial state upon a lapse of time during which no signal is received from the generating device. Timer 49 may, in some cases, be dispensed with, for example, cessation of an analog flow indicative signal may be adequate to appropriately reset counter 51. In one implementation, the second timer 49 lapse of time was selectively adjustable through a range of about one to five minutes. After flow indicative signals cease, the solid state switch 52 returns to a conducting state, however water availability does not resume because the contacts of the solenoid actuated relay are both in the illustrated de-energized position. To restore potential water flow, a normally open reset switch 29 which is in parallel with the second or lower pair of normally open relay contacts is depressed to re-energize and re-latch the solenoid actuated relay. The functions of counter 51 and solid state switch 52 may, for example, be provided by a CNT programmable multifunction digital time delay relay/counter such as model CNT-35-96.

Figure 3:
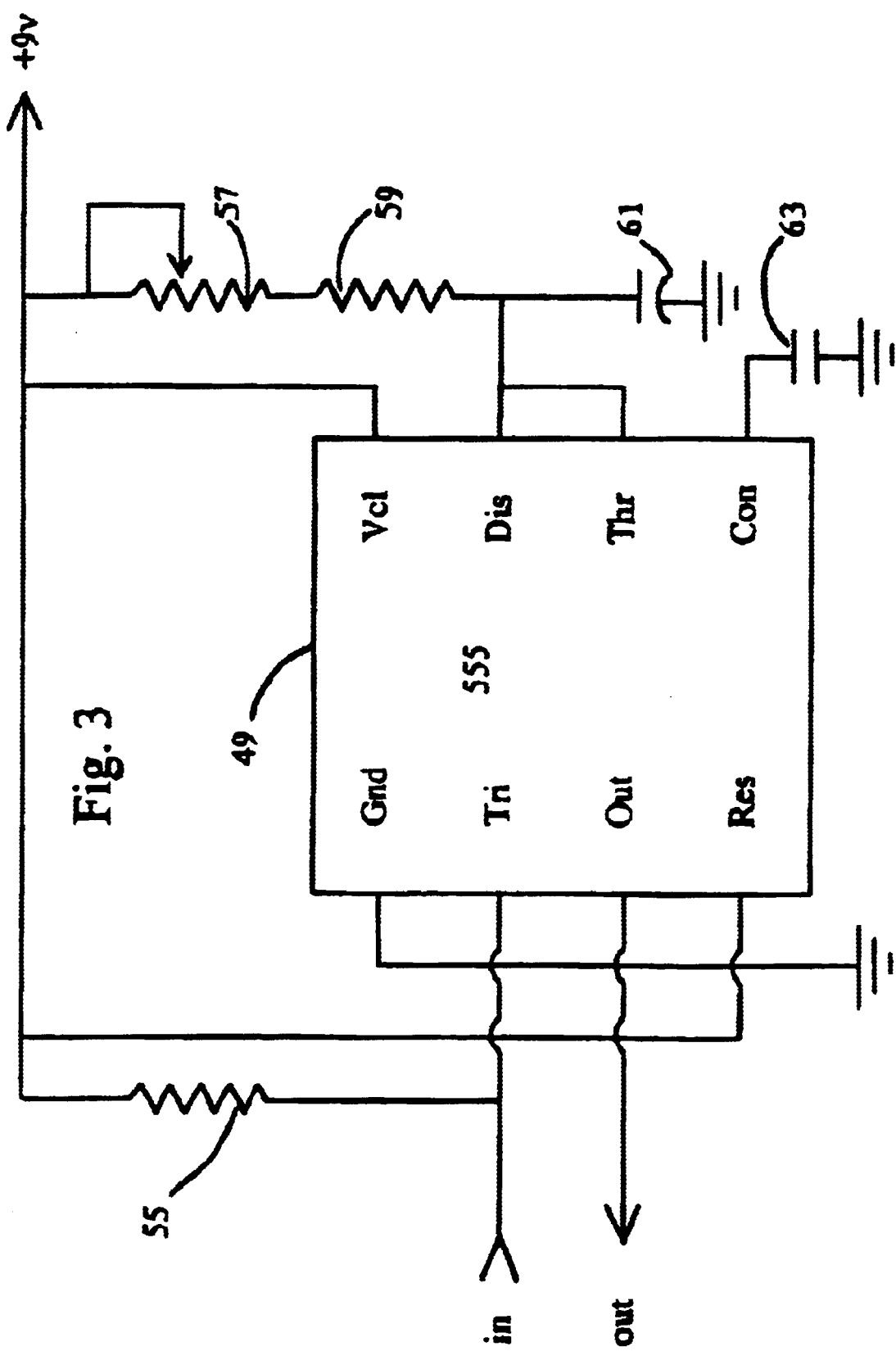
FIG. 3 is a more detailed schematic illustration of the timer circuit of FIG. 2.

Timer 49 may be implemented as shown in FIG. 3. The integrated circuit forming the nucleus of timer 49 is a type 555. The one to five minute time adjustment is achieved by a variable 500,000 ohm potentiometer which is in series with a 100,000 ohm resistor 59 and 500 Φfd. capacitor 61. Capacitor 63 is 0.01 Φfd. while resistor 55 is 10,000 ohms.

System operation is summarized in FIG. 4. The commencement of water flow 65 initiates signals 67 indicative thereof. Upon receipt of a flow indicative signal, timing begins as indicated at 69. The flow indicative signal is monitored at 71 and if the signal continues to, indicate a flow, timing is continued as shown at 73. If monitoring indicates the flow has ceased (by expiration of the time set on timer 49, for example), the timer is reset as at 75. If the elapsed time 81 reaches the predetermined time, flow is disabled as shown at 79. The length of time water flow that is allowed without shutdown (the count which counter 51 must reach before switch 52 turns off) is adjustable as shown at 77.

I claim:

1. A water flow control system, comprising:
a water flow detecting and signal generating device for detecting a flow of water and operable in response to detection of a flow of water to provide water flow indicative signals;
a first timer coupled to the generating device for initiating timing of a predetermined time interval upon commencement of flow indicative signals;
a normally closed solenoid actuated valve controlled by the timer for selectively interrupting the flow of water upon an indication from the timer that a predetermined time interval has expired;
a second timer for resetting the first timer to an initial state upon a lapse of time during which no signal is received from the generating device; and
a double-pole, double-throw solenoid actuated relay having a first pair of normally open contacts operable when closed to supply enabling current to said solenoid actuated valve and a second pair of normally open contacts operable when closed to form part of a latching circuit to maintain the solenoid energized.

2. The water flow control system of claim 1, wherein the water flow detecting and signal generating device comprises a digital signal generating water meter.

3. The water flow control system of claim 1, further including a normally open reset switch in parallel with a second pair of normally open contacts operable when depressed to re-energize and re-latch said solenoid actuated relay.

4. The water flow control system of claim 1, further including a double-pole, triple throw switch having a first position in which the control system is disabled allowing unrestricted water flow, a second position in which the control system disables the solenoid actuated valve preventing water flow, and a third position in which the control system is operable to interrupt water flow only upon detecting flow for the predetermined time interval.

5. The water flow control system of claim 1, wherein said first timer comprises a programmable multifunction digital time delay relay/counter.

6. The water flow control system of claim 1, wherein said second timer lapse of time is selectively adjustable through a range of about one to five minutes.

7. The water flow control system of claim 1, wherein said first timer predetermined time interval is selectively adjustable through a range up to a maximum of about one hour.

8. A water flow control system, comprising:

a water flow detecting and signal generating device for detecting a flow of water and operable in response to detection of a flow of water to provide water flow indicative signals;

a first timer coupled to the generating device for initiating timing of a predetermined time interval upon commencement of flow indicative signals;

a normally closed solenoid actuated valve controlled by the timer for selectively interrupting the flow of water upon an indication from the timer that a predetermined time interval has expired;

a second timer for resetting the first timer to an initial state upon a lapse of time during which no signal is received from the generating device; and a normally open reset switch in parallel with a second pair of normally open contacts operable when depressed to re-energize and re-latch a solenoid actuated relay connected to said solenoid actuated valve.

9. The water flow control system of claim 8, wherein said water flow detecting and signal generating device comprises a digital signal generating water meter.

10. The water flow control system of claim 8, said solenoid actuated relay includes a double-pole, double-throw solenoid actuated relay having a first pair of normally open contacts operable when closed to supply enabling current to the solenoid actuated valve and a second pair of normally open contacts operable when closed to form part of a latching circuit to maintain the solenoid energized.

11. The water flow control system of claim 8, said solenoid actuated relay includes a double-pole, triple throw switch having a first position in which the control system is disabled allowing unrestricted water flow, a second position in which the control system disables the solenoid actuated valve preventing water flow, and a third position in which the control system is operable to interrupt water flow only upon detecting flow for the predetermined time interval.

12. The water flow control system of claim 8, wherein said first timer comprises a programmable multifunction digital time delay relay/counter.

13. The water flow control system of claim 8, wherein said second timer lapse of time is selectively adjustable through a range of about one to five minutes.

14. The water flow control system of claim 8, wherein said first timer predetermined time interval is selectively adjustable through a range up to a maximum of about one hour.

15. A water flow control system, comprising:

a water flow detecting and signal generating device for detecting a flow of water and operable in response to detection of a flow of water to provide water flow indicative signals;

a first timer coupled to the generating device for initiating timing of a predetermined time interval upon commencement of flow indicative signals;

a normally closed solenoid actuated valve controlled by the timer for selectively interrupting the flow of water upon an indication from the timer that a predetermined time interval has expired;

a second timer for resetting the first timer to an initial state upon a lapse of time during which no, signal is received from the generating device; and a double-pole, triple throw switch having a first position in which the control system is disabled allowing unrestricted water flow, a second position in which the control system disables the solenoid actuated valve preventing water flow, and a third position in which the control system is operable to interrupt water flow only upon detecting flow for the predetermined time interval.

16. The water flow control system of claim 15, wherein said water flow detecting and signal generating device comprises a digital signal generating water meter.

17. The water flow control system of claim 15, further including a double-pole, double-throw solenoid actuated relay having a first pair of normally open contacts operable when closed to supply enabling current to the solenoid actuated valve and a second pair of normally open contacts operable when closed to form part of a latching circuit to maintain the solenoid energized.

18. The water flow control system of claim 15, further including a normally open reset switch in parallel with the second pair of normally open contacts operable when depressed to re-energize and re-latch a solenoid actuated relay connected to said solenoid actuated valve.

19. The water flow control system of claim 15, wherein said first timer comprises a programmable multifunction digital time delay relay/counter.

20. The water flow control system of claim 15, wherein said second timer lapse of time is selectively adjustable through a range of about one to five minutes.

21. The water flow control system of claim 15 wherein said first timer predetermined time interval is selectively adjustable through a range up to a maximum of about one hour.

* * * * *